(No Model.)
J. W. DENTON.
Means for Trimming Hoofs of Animals.
No. 241,942. Patented May 24, 1881.
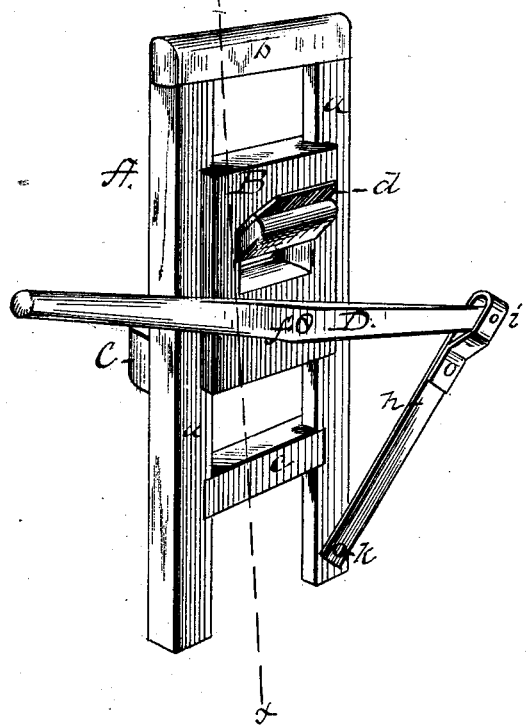
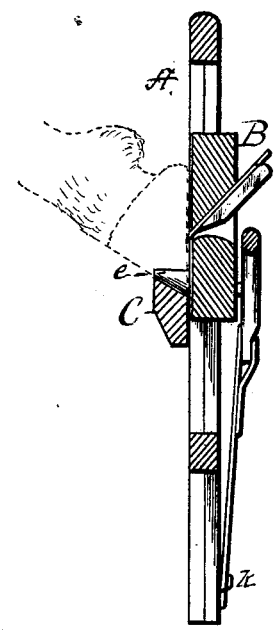
Witnesses
Robert Everett,
A. G. Hylman
Inventor
J. W. Denton,
By Frank A. Fouts,
Atty

UNITED STATES PATENT OFFICE.

JARRETT W. DENTON, OF HENDERSON, KENTUCKY.

MEANS FOR TRIMMING HOOFS OF ANIMALS.

SPECIFICATION forming part of Letters Patent No. 241,942, dated May 24, 1881.

Application filed April 18, 1881. (No model.)

*To all whom it may concern:*

Be it known that I, JARRETT W. DENTON, a citizen of the United States of America, residing at Henderson, in the county of Henderson and State of Kentucky, have invented certain new and useful Improvements in Means for Trimming Hoofs of Animals; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of this invention is to construct a cheap, simple, light, and convenient implement for paring the hoofs of horses and oxen preparatory to fitting the shoes thereon.

Heretofore an implement of this character has been constructed with a vertical standard or frame supported on a platform to which is attached a post having pivoted thereto a lever supported in an elevated position by means of a spring, said lever being connected to a reciprocating carriage carrying a paring-knife by means of a pitman. This implement has not proved entirely satisfactory to the trade for several reasons, among which may be given, first, that it is heavy and cumbersome to handle; second, that it is difficult to be applied satisfactorily for trimming the hoof; third, that owing to the position of the workman it is difficult to hold the hoof in the recess and at the same time operate the lever; and, fourth, it is expensive.

My improvement, therefore, consists in an oblong frame provided with a transverse bar having an inclined recess or depression, into which fits the animal's hoof, a sliding carriage, provided with a trimming or paring knife, an actuating-lever pivoted directly to the sliding carriage, and also pivoted to a bar attached to the base of the frame.

My improvement also consists in the novel construction and arrangement of the parts, as will be hereinafter more fully set forth and specifically claimed.

In the accompanying drawings, Figure 1 is a perspective view of my improved implement; and Fig. 2 is a vertical sectional view of the implement, taken through the line $x\ x$.

Reference being had to the drawings, the letter A represents the frame of the implement, composed of upright bars $a$, top cross-piece, $b$, and the lower cross-piece, $c$. These uprights are of substantial strength, in order to meet the strain that may be put upon them, and are "tongued" on the inner side for the purpose of receiving the grooves of the sliding block and holding it steady in its reciprocating movements. The lower cross-piece, $c$, is placed in such position that it serves as a stop and rest to the sliding block at its lowest point of travel.

The sliding block B is grooved on both edges to fit over the tongues of the uprights, and its course is vertical. This sliding block is also provided with a mortise for the paring blade or knife $d$, which is centrally located therein, and preferably consists of a planing-bit and wedge, as being capable of easy and accurate adjustment.

On the front of the implement is secured firmly the cross-piece C, provided with the centrally-located inclined recess $e$ for the purpose of receiving and holding the hoof of the animal during the operation of paring.

The letter D represents the actuating-lever pivoted in its part $f$ to the lower central part of the sliding block, as shown, and also pivoted to the arm $h$ at $i$, which arm is pivoted to the lower end of one of the uprights, as seen at $k$. The object of this compound lever is to admit the power to operate in a right line with the upward and downward movement of the sliding block.

From this description those skilled in the trade may be enabled to readily construct the implement and adjust it ready for the work designed.

To pare the hoof of an animal by my device the foot is lifted into the recess of the cross-bar in front of the implement, substantially as seen in Fig. 2, and held by one hand of the workman against the face of the sliding block, the lever being worked by the other hand, and when the movement of the lever causes the bit or blade in the sliding block to come in contact with the bottom of the hoof it is planed off to suit the desires of the workman.

It is obvious that the bit or blade can be adjusted to a nicety by means of the wedge, so as to remove a heavy or fine shaving from the hoof of the animal.

It will be observed that the operating-lever is attached to the sliding block so as to be parallel with the bar supporting the hoof of the animal. The advantages of this arrangement will be readily seen by horseshoers.

What I claim as my invention, and desire to secure by Letters Patent, is—

1. In an implement for paring or trimming hoofs of animals, the combination, with a frame for supporting the hoof of the animal, and a sliding block carrying a paring-knife, of the actuating-lever D, pivoted directly to the sliding block and to the pivoted arm $h$, said parts being arranged in parallel plane with the hoof-supporting frame, as described.

2. As an improved article of manufacture, the hoof-trimming implement consisting of the rectangular frame A, with the transverse bar C, provided with the inclined recess $e$, the sliding block B, with the paring or trimming knife and wedge, the actuating-lever D, and pivoted arm $h$, all constructed and arranged as described.

In testimony whereof I affix my signature in presence of two witnesses.

JARRETT W. DENTON.

Witnesses:
C. H. JOHNSON,
GEO. A. PRENTICE.